3,832,277
HYDROXYLAMINE TREATED HEMICELLULOSE-CONTAINING REGENERATED CELLULOSE PRODUCT

Frederick R. Smith, Wilmington, Del., and Joseph W. Schappel, Morton, Pa., assignors to FMC Corporation, Philadelphia, Pa.
No Drawing. Filed Feb. 24, 1972, Ser. No. 229,193
Int. Cl. D21c 9/00
U.S. Cl. 162—70                                                                 6 Claims

ABSTRACT OF THE DISCLOSURE

A hemicellulose-containing cellulose product treated with hydroxylamine or a hydroxylamine salt to reduce yellowing when the cellulose product is heated to a temperature above 100° C. A specific examples of said cellulose product is a hemicellulose-containing regenerated cellulose product.

---

In the treatment and use of hemicellulose-containing cellulose products, including regenerated cellulose fibers and wood pulp, the products are heated to temperatures above 100° C. for various periods of time.

One treatment of this type is the steam sterilization of rayon (regenerated cellulose fibers) or wood pulp, for example, at about 120° C. for 15 minutes.

Another treatment of this type is the heat curing of a non-woven fabric prepared from rayon fibers, an acid salt catalyst system and a heat-hardenable resin latex binder. When ordinary cellulose products which contain hemicellulose, including, for example, pentosans, mannans and xylans, are heated to above 100° C., changes in some fraction of the hemicellulose is brought about, producing a yellow color in the product. The presence of acid salt catalysts during the heating appears to hasten the appearance of the yellow color.

It is an object of this invention to provide a hemicellulose-containing cellulose product having a reduced tendency to form a yellow color on heat treating.

This and other objects will be attained in accordance with this invention, which is a hemicellulose-containing cellulose product which has been treated with hydroxylamine or a hydroxylamine salt in an amount sufficient to reduce the formation of a yellow color in the cellulose product on heating to a temperature above 100° C.

Wood pulps, except for very high purity pulps, and regenerated cellulose products produced therefrom generally contain some hemicellulose material even after chemical purification and washing. In conventional heat treatments of these products above 100° C., it is believed that there is a rearrangement involving the carbonyl groups of the hemicellulose thereby producing yellow color. This rearrangement is blocked by the hydroxylamine to prevent color formation.

Hydroxylamine or a hydroxylamine salt, the most important of which are hydroxylamine sulfate, hydroxylamine hydrochloride, and hydroxylamine acid sulfate, is advantageously applied in an aqueous medium to the cellulose product. Hydroxylamine and its salts are generally water-soluble and soluble in lower alkanols in the amounts employed herein. For the treatment of rayon fibers, the hydroxylamine is preferably incorporated in the yarn finish bath and the cellulose fibers dried at elevated temperature. Thereafter, the fibers are steam sterilized without the formation of color.

Another aspect of this invention involves the incorporation of a hydroxylamine in a heat-hardenable resin emulsion binder used in the preparation of non-woven sheets along with an acid salt catalyst. This preparation is applied to regenerated cellulose fibers, preferably in the form of carded webs, and the non-woven is formed and cured without color formation in the fibers.

The hydroxylamines are also applied to the cellulose products in separate treatment baths or sprays at any suitable stage before they are subjected to heat, which tends to produce the yellow color. Concentration of the hydroxylamines in any liquid treating bath preferably ranges from about 0.05 to about 1.5% based on the weight of the bath, although wide variations in the concentration of hydroxylamine above the preferred range will not appreciably affect the result. The hydroxylamine aqueous treating baths should preferably have a pH of about 3 to about 9 and the temperature of the treatment bath should preferably be between about 25° and 70° C.

Treatment of the cellulose products with the hydroxylamines will provide protection against yellowing of the products which are subjected to high temperatures up to 30 days or more after the initial treatment.

The hydroxylamines are not believed to remain as such after application to the cellulose product. It is thought that there is a rather fast reaction of the hydroxylamine with functional groups in the hemicellulose to block color formation. Any excess hydroxylamine probably forms ammonia, nitrogen and/or nitrogen oxides.

Cellulose products which can be treated in accordance with this invention include, for example, wood pulp chips and sheets, regenerated cellulose fibers, yarns, sheets, films, sponges, chamois and the like. The most important use of the invention is in preventing yellowing of rayon yarn after steam sterilization and during the acid salt catalyzed, heat curing of rayon non-woven fabric. The use of the hydroxylamines for this purpose also permits the use of less expensive pulps containing higher amounts of hemicellulose for rayon production without fear of obtaining a yellowing product.

The particular type of acid salt-catalyzed, heat-hardenable resin binder used to form non-wovens from rayon is not critical to the invention. Frequently, the binder employed is a self-crosslinking acrylic resin obtained as a latex containing from about 15 to about 50% solids by weight. To aid and hasten curing of the resin in the non-woven, acid salt catalyst systems are usually employed, including, for example, diammonium hydrogen phosphate or ammonium chloride-diammonium hydrogen phosphate mixture, magnesium acetate-hydroxylamine acid sulfate mixture, magnesium chloride, boric acid, calcium acetate-$NH_4Cl$ mixture.

To further demonstrate this invention, the following examples are set forth.

EXAMPLE I

Hemicellulose-containing regenerated cellulose fibers were prepared from a hemicellulose-containing wood pulp, using the viscose process. Portions of this fiber were treated in different ways. Those which received aque-treatments were dried at 105° C., and then all were steam sterilized for 15 minutes at 121° C. The fibers were compared for color change and whiteness. One portion of the fibers was given no finish treatment. Another portion of the fiber was treated for 10 minutes in a finish bath consisting of water containing 0.25% of Tween 20 (polyoxyethylene sorbitan monolaurate). Still another portion was treated for 10 minutes in the same finish bath additionally containing 0.5% hydroxylamine at pH 5. A fourth portion was treated for 10 minutes in the same finish bath additionally containing 1.0% hydroxylamine at pH 5. All the baths were maintained at 65° C.

The steam sterilized yarn was tested for color change and whiteness in a Colormaster Model V (Manufacturer's Engineering & Equipment Corporation, Warrington, Pa.). Color change for the fibers is indicated by a numerical value which increases as the degree of yellowness increases. The whiteness index is a numerical value obtained by comparison with a standard white plate. The greater the variance from the standard, the lower the index number.

The following table shows the values obtained for the prepared samples in the Colormaster:

TABLE I

| Fiber treatment | Color change | Whiteness index |
|---|---|---|
| 1. No finish | 4.9 | 943.2 |
| 2. Finish | 3.4–4.6 | 950.5–947.8 |
| 3. Finish plus 0.5% NH$_2$OH | 2.9–2.4 | 953.2–954.6 |
| 4. Finish plus 1.0% NH$_2$OH | 3.4 | 947.8 |

EXAMPLE II

A sample of regenerated cellulose fibers prepared as in Example I is immersed for 10 minutes in an aqueous finish bath containing 0.25% Tween 20 at a bath temperature of 65° C. Another sample of the same fiber was immersed in a similar bath additionally containing 0.5% hydroxylamine sulfate. The fibers are dried at 105° C.

To simulate the conditions for the preparation of a non-woven with an acid salt catalyzed binder, portions of both of the above fiber samples were treated with an aqueous catalyst solution having a pH of 7.55 and containing 1.5% ammonium chloride and 1.5% diammonium hydrogen phosphate. The fibers were dried and cured at 150° C. for 5 minutes.

Color comparisons of the treated fiber samples was accomplished by visual matching with a set of standards prepared as follows. Portions of a non-yellowing fiber (A) and yellowing fiber (B) were treated with the aqueous mixed acid salt catalyst soltion (1.5% NH$_4$Cl+1.5% (NH$_4$)$_2$HPO$_4$) and dried. These two fiber masses were then used to prepare a series of mixtures which were carefully blended by carding and then cured at 150° C. for 5 minutes. The fiber samples were then arranged on a card and used as references for comparison as indicated. Yellowness increases with the rating scale.

| Fraction of fiber A | 1 | ¾ | ½ | ¼ | 0 |
|---|---|---|---|---|---|
| Fraction of fiber B | 0 | ¼ | ½ | ¾ | 1 |
| Color rating | 0 | 1 | 2 | 3 | 4 |

TABLE II

Fiber treatment:                      Yellowness rating
1. Uncured with finish _____ ½
2. Cured with finish and acid salt _____ 3
3. Cured with finish, hydroxylamine and acid salt _____ ½

The above experiment was repeated using hemicellulose-containing wood pulp chips instead of rayon fibers with good results in suppressing the formation of yellow color in the cellulose product.

Similar experiments were carried out using from 0.1 to 1% hydroxylamine sulfate in the finish bath at a pH ranging from about 3 to about 9 and at bath temperatures of from 25° to 70° C. Residence times for the fiber in the bath were varied from one to 10 minutes. Reduction in color formation in regenerated cellulose fibers was evident in each experiment.

EXAMPLE III

Hemicellulose-containing regenerated cellulose fibers were prepared as in Example I, given a conventional finish treatment and dried. The fibers were then carded and formed into webs. One of these webs was treated with a freshly prepared aqueous solution of 0.5% by weight hydroxylamine acid sulfate, 0.5% by weight diammonium hydrogen phosphate and about 25% by weight of a self crosslinking acrylic resin to obtain a pickup of about 100% by weight. Another of the webs was treated with a freshly prepared aqueous solution of 0.5% by weight of ammonium chloride, 0.5% by weight of diammonium hydrogen phosphate and about 25% by weight of the self-crosslinking acrylic latex to obtain a pick-up of 100% by weight. The webs were dried and heat cured at 150° C. for 5 minutes.

The following table shows the results of visual comparison of the above non-woven webs in the procedure defined in Example II.

TABLE III

|  | Yellowness rating |
|---|---|
| No hydroxylamine | 2 |
| With hydroxylamine | 0 |

It is apparent from the above examples that the hydroxylamine treatments of hemicellulose-containing cellulose products are beneficial in preventing or reducing color formation when the products are subjected to elevated temperatures. The elevated temperature is, of course, below that which will case charring of the cellulose product. In general, temperatures above 100° C. will tend to promote yellowing. As the temperature is increased, the residence time to form the yellow color will decrease.

Hydroxylamine salts, other than those previously mentioned, are useful, including, for example, hydroxylamine acetate and other fatty acid salts.

Various changes and modifications may be made in practicing the invention without departing from the spirit and scope thereof and, therefore, the invention is not to be limited except as defined in the appended claims.

We claim:

1. A hemicellulose-containing regenerated cellulose product having a reduced tendency to yellow at elevated temperatures prepared by treating said cellulose product with hydroxylamine or hydroxylamine salt in an amount sufficient to reduce the formation of yellow color in the cellulose product when heated above 100° C.

2. The product of claim 1 prepared by treatment with an aqueous solution of hydroxylamine or hydroxylamine salt at a concentration of from about 0.05 to about 1.5% based on the weight of the solution.

3. The product of claim 1 which is regenerated cellulose fibers.

4. The product of claim 3 which is prepared by treatment with an aqueous solution of from about 0.05 to about 1.5% hydroxylamine or hydroxylamine salt, based on the weight of the solution.

5. The product of claim 4 wherein the aqueous solution contains a finishing agent for regenerated cellulose fibers.

6. The product of claim 1 which contains an acid salt catalyst.

References Cited

UNITED STATES PATENTS

| 3,401,076 | 9/1968 | Paterson | 162—70 |
| 3,089,747 | 5/1963 | Welch | 8—116 R X |
| 2,864,723 | 12/1958 | Fluck et al. | 8—116 R X |
| 2,889,192 | 6/1959 | D'Adamo et al. | 8—116 R X |
| 3,030,235 | 4/1962 | Goudie et al. | 8—116 R X |
| 2,821,489 | 1/1958 | McNeer et al. | 8—116 R X |

OTHER REFERENCES

Schmidlin: *Preparation and Dyeing of Synthetic Fibres*, 1963, pp. 321–323.

S. LEON BASHORE, Primary Examiner

A. L. CORBIN, Assistant Examiner

U.S. Cl. X.R.

8—116 R

UNITED STATES PATENT OFFICE
CERTIFICATE OF CORRECTION

Patent No. 3,832,277     Dated August 27, 1974

Inventor(s) Frederick R. Smith and Joseph W. Schappel

It is certified that error appears in the above-identified patent and that said Letters Patent are hereby corrected as shown below:

Col. 1, line 3, "PRODUCT" should read --PRODUCTS--;
line 16, "examples" should read --example--.
Col. 2, line 53, "aque-" should read --aqueous--.
Col. 3, line 5, TABLE I, "3.4-4.6" should read --3.4 and 4.6--; 950.5-947.8" should read 950.5 and 947.8--; "2.9-2.4" should read --2.9 and 2.4--; "953.2-954.6"should read --953.2 and 954.6--.  Col. 3, line 31, "soltion" should read --solution--.
Col. 4, line 19, "case" should read --cause--.

Signed and sealed this 26th day of November 1974.

(SEAL)
Attest:

McCOY M. GIBSON JR.
Attesting Officer

C. MARSHALL DANN
Commissioner of Patents